United States Patent
Ozog

(10) Patent No.: US 10,740,645 B2
(45) Date of Patent: Aug. 11, 2020

(54) SYSTEM AND METHOD FOR IMPROVING THE REPRESENTATION OF LINE FEATURES

(71) Applicant: Toyota Research Institute, Inc., Los Altos, CA (US)

(72) Inventor: Paul J. Ozog, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 126 days.

(21) Appl. No.: 16/023,645

(22) Filed: Jun. 29, 2018

(65) Prior Publication Data

US 2020/0005068 A1  Jan. 2, 2020

(51) Int. Cl.
*G06K 9/44* (2006.01)
*G06K 9/46* (2006.01)
*G06T 7/73* (2017.01)
*G06K 9/00* (2006.01)

(52) U.S. Cl.
CPC ............ *G06K 9/44* (2013.01); *G06K 9/00798* (2013.01); *G06K 9/4604* (2013.01); *G06T 7/74* (2017.01); *G06T 2207/30256* (2013.01)

(58) Field of Classification Search
CPC .... G06K 9/00798; G06K 9/44; G06K 9/4604; G06T 2207/30256
See application file for complete search history.

(56) References Cited

U.S. PATENT DOCUMENTS

| | | | |
|---|---|---|---|
| 8,553,989 B1 | 10/2013 | Owechko et al. | |
| 9,082,008 B2 | 7/2015 | Ma et al. | |
| 9,142,019 B2 | 9/2015 | Lee | |
| 9,170,334 B2 | 10/2015 | Baldwin et al. | |
| 9,489,753 B1 * | 11/2016 | Bishop | A61B 3/102 |
| 9,633,483 B1 | 4/2017 | Xu et al. | |
| 9,807,365 B2 | 10/2017 | Cansizoglu et al. | |
| 2008/0131029 A1 | 6/2008 | Coleby et al. | |

(Continued)

OTHER PUBLICATIONS

Roberts, K. S., "A New Representation for a Line," Proceedings CVPR '88: The Computer Society Conference on Computer Vision and Pattern Recognition, IEEE, 1988.

*Primary Examiner* — John J Lee

(74) *Attorney, Agent, or Firm* — Christopher G. Darrow; Darrow Mustafa PC

(57) ABSTRACT

System, methods, and other embodiments described herein relate to improving an electronic representation of lines. In one embodiment, a method includes, in response to acquiring sensor data from at least one sensor representing a surrounding environment of a robotic device, extracting a feature representation of an observed line feature in the sensor data by providing a probability distribution that is defined based, at least in part, on feature parameters that overparameterize the observed line feature. The method includes converting the feature representation of the observed line feature into reduced parameters to avoid the feature parameters overparameterizing the observed line feature. The reduced parameters include an observation uncertainty for the line feature that is based, at least part, on the probability distribution. The method includes providing a detection distribution according to a correlation between the reduced parameters and a mapped line feature.

20 Claims, 5 Drawing Sheets

(56) References Cited

U.S. PATENT DOCUMENTS

| | | | |
|---|---|---|---|
| 2010/0034422 A1* | 2/2010 | James | G06T 7/246 |
| | | | 382/103 |
| 2010/0208937 A1 | 8/2010 | Kmiecik et al. | |
| 2016/0219907 A1* | 8/2016 | Phillips | A23G 3/0097 |
| 2016/0259993 A1 | 9/2016 | Ulbricht et al. | |
| 2018/0024565 A1 | 1/2018 | Fridman | |
| 2019/0078960 A1* | 3/2019 | Yoon | H04R 29/00 |

* cited by examiner

SYSTEM AND METHOD FOR IMPROVING THE REPRESENTATION OF LINE FEATURES

TECHNICAL FIELD

The subject matter described herein relates, in general, to systems and methods for representing a line feature from a noisy observation, and, in particular, to converting an acquired representation of the line feature and providing observation uncertainties as a function thereof that overcome difficulties with overparameterization.

BACKGROUND

Lines are an integral aspect of representing things (e.g., lane markers, poles, curbs, edges of buildings, etc.) in an electronic form. In general, a computing system may represent a line using, for example, six or more values as a parameterization. The values may correspond with endpoints of the line, directional vectors for the line, lengths, and so on. In either case, the use of a number of values beyond the corresponding degrees of freedom for a line results in the line feature being overparameterized.

Consequently, the overparameterized line feature can introduce difficulties into how the representation is applied in different applications. For example, initial observations of the line feature can include noise within sensor data that is from various sources. The presence of noise and thus the extrapolation of an uncertainty for detection of the line feature can complicate further determinations due to the overparameterization.

For example, aspects such as determining corresponding features between observed features and mapped features in a predefined map may result in duplicated features and/or in difficulties determining uncertainties of correlations. Such issues result from, in one aspect, difficulties in representing the observed uncertainty using a probabilistic approach. Therefore, representing line features using an overparameterization of values can result in difficulties when applying the observed line features in different frameworks.

SUMMARY

In one embodiment, example systems and methods relate to a manner of improving the representation of line features within electronic systems using a reduced representation that avoids overparameterizing the line features. Thus, the disclosed approach avoids the noted difficulties by representing line features in a one-to-one correspondence with associated degrees of freedom for a line while also representing the uncertainty of such line features from noisy observations using a covariance matrix that is full-rank. In this way, difficulties with inefficiencies in various applications that result in duplication of line features and other inefficiencies be avoided.

For example, in one approach, a translation system initially acquires sensor data that includes an observation of a line feature. The sensor data intrinsically includes some amount of noise, and thus the observation of the line feature includes some marginal uncertainty. Moreover, in one embodiment, the line feature is initially represented using feature parameters that include at least six values (e.g., endpoints in 3D space) and thus a corresponding covariance matrix is at least six-by-six to represent the marginal uncertainty of the line feature. However, as previously mentioned, using more values than corresponding degrees of freedom for a line results in the line being overparameterized and the covariance matrix not being full-rank.

Accordingly, the translation system samples from the observed line feature according to a defined pattern (e.g., sigma points). The sampled points are translated into reduced parameters. In one embodiment, the reduced parameters represent the line feature using angular and positional values (e.g., azimuth, elevation, and a 2D point). Subsequently, the translation system uses the reduced parameters derived from the samples to, for example, provide multiple representations of the line feature that are then processed according to an unscented transform to determine an error and a mean therein. The translation system then electronically outputs the reduced parameters including four values representing a mean of the samples and a covariance matrix representing observation uncertainty of the line feature. Accordingly, the translation system provides a representation of the line that is not overparameterized along with a full-rank covariance matrix specifying the observation uncertainty. Consequently, the translation system can then proceed with further applications that avoid the previously identified difficulties and permit a probabilistic approach to, for example, determining the correspondence between the observed line feature and mapped line features. In this way, the disclosed systems and methods improve over previous approaches by providing a parameterization that is optimized according to the degrees of freedom for a line and, thus, includes a covariance matrix that is full-rank.

In one embodiment, a translation system for improving electronic representation of lines is disclosed. The translation system includes one or more processors and a memory communicably coupled to the one or more processors. The memory stores a sensor module including instructions that when executed by the one or more processors cause the one or more processors to, in response to acquiring sensor data from at least one sensor representing a surrounding environment of a robotic device, extract a feature representation of an observed line feature in the sensor data by providing a probability distribution that is defined based, at least in part, on feature parameters that overparameterize the observed line feature. The memory stores a transform module including instructions that when executed by the one or more processors cause the one or more processors to convert the feature representation of the observed line feature into reduced parameters to avoid the feature parameters overparameterizing the observed line feature. The reduced parameters include an observation uncertainty for the line feature that is based, at least part, on the probability distribution. The transform module includes instructions to provide a detection distribution according to a correlation between the reduced parameters and a mapped line feature.

In one embodiment, a non-transitory computer-readable medium for improving an electronic representation of lines and including instructions that when executed by one or more processors cause the one or more processors to perform one or more functions. The instructions include instructions to, in response to acquiring sensor data from at least one sensor representing a surrounding environment of a robotic device, extract a feature representation of an observed line feature in the sensor data by providing a probability distribution that is defined based, at least in part, on feature parameters that overparameterize the observed line feature. The instructions include instructions to convert the feature representation of the observed line feature into reduced parameters to avoid the feature parameters overparameterizing the observed line feature. The reduced parameters include an observation uncertainty for the line feature that is based, at least part, on the probability distribution. The instructions include instructions to provide a detection distribution according to a correlation between the reduced parameters and a mapped line feature.

In one embodiment, a method for improving an electronic representation of lines disclosed. In one embodiment, a method includes, in response to acquiring sensor data from at least one sensor representing a surrounding environment of a robotic device, extracting a feature representation of an observed line feature in the sensor data by providing a probability distribution that is defined based, at least in part, on feature parameters that overparameterize the observed line feature. The method includes converting the feature representation of the observed line feature into reduced parameters to avoid the feature parameters overparameterizing the observed line feature. The reduced parameters include an observation uncertainty for the line feature that is based, at least part, on the probability distribution. The method includes providing a detection distribution according to a correlation between the reduced parameters and a mapped line feature.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
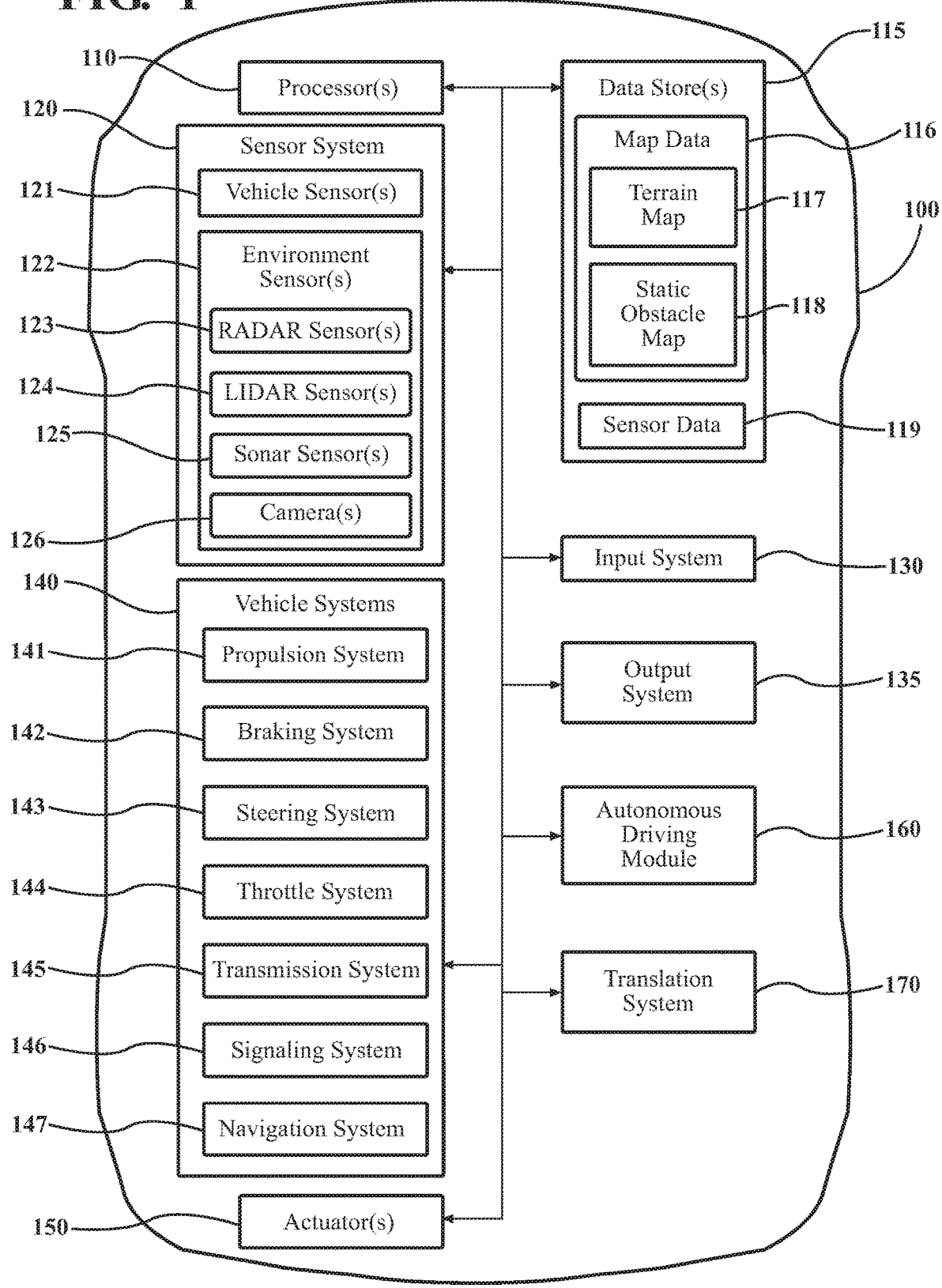
FIG. 1 illustrates one embodiment of a vehicle within which systems and methods disclosed herein may be implemented.

Systems, methods, and other embodiments associated with improving the representation of line features within electronic systems using a reduced representation that avoids overparameterizing the line features are disclosed. As mentioned previously, electronic systems generally represent various features observed in a surrounding environment through the use of lines that approximate the features themselves (e.g., lane markers, poles, etc.) or that approximate aspects of the features (e.g., building corners, curbs, etc.). As a further matter, the observations of the line features generally involve some amount of noise that is introduced through either aspects of an observing sensor itself (i.e., intrinsic errors) or through aspects of the surrounding environment (e.g., weather, etc.). In either case, the representation of the line is generally accompanied by an observation uncertainty that quantifies this disparity between the actual real-world feature and the observation thereof.

However, when the representation of the line feature is overparameterized (i.e., more values representing the line feature than corresponding degrees of freedom), the extrapolation of the uncertainty into further applications (e.g., SLAM) and the use of the representation itself complicates the further applications and generally results in inefficiencies such as duplication of line features, and specialized routines that approximate probabilities.

Therefore, in one embodiment, a translation system, and associated methods, as disclosed herein, provide for a manner of improving the representation of line features within electronic systems using a reduced representation that avoids overparameterizing the line features. For example, the translation system may be embedded within a robotic device such as an autonomous vehicle or other machine that includes one or more sensors to perceive aspects surrounding the device. The translation system can acquire, either directly or indirectly, sensor data via one or more sensors that embodies observations of the surroundings. Accordingly, the translation system, in one approach, implements a line segment detector that parses the sensor data and extracts a line feature from the sensor data.

Because the sensor data intrinsically includes some amount of noise, the translation system may initially represent the line according to a probability distribution that is provided according to a set of feature parameters defining the line feature. That is, in one embodiment, the line feature is initially represented using feature parameters that include at least six values (e.g., endpoints in 3D space) along with a corresponding covariance matrix that is at least six-by-six and represents the marginal uncertainty of the line feature. However, as previously mentioned, using more values than corresponding degrees of freedom for a line results in the line being overparameterized.

Accordingly, to overcome the difficulties associated with the overparameterization, the translation system samples from the probability distribution describing the observed line feature according to a defined pattern (e.g., sigma points). The translation system then translates the sampled points into reduced parameters. In one embodiment, the reduced parameters represent the line feature using angular (e.g., azimuth and elevation) and positional values (e.g., a point in space). Subsequently, the translation system uses the representation derived from the samples and defined according to the reduced parameters to, for example, provide multiple representations of the line feature that are then processed according to an unscented transform to determine an error and a mean therein. The translation system then, for example, electronically outputs the reduced parameters including four values representing a mean of the samples and a covariance matrix representing observation uncertainty of the line feature.

As a result of this process, the translation system provides a representation of the line that avoids overparameterization along with a full-rank covariance matrix specifying the observation uncertainty. Consequently, the translation system provides the reduced parameters and can then proceed with further applications that avoid the previously identified difficulties and permit a probabilistic approach to, for example, determining the correspondence between the observed line feature and mapped line features. In this way, the disclosed systems and methods improve over previous approaches by providing a parameterization that is optimized according to the degrees of freedom for a line and, thus, includes a covariance matrix that is full-rank.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus may implement the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, while the translation system 170 is illustrated as being wholly included within the vehicle 100, in one embodiment, the translation system 170 may be at least partially provided as a cloud-based service that is remote from the vehicle 100.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a translation system 170 that is implemented to perform methods and other functions as disclosed herein relating to acquiring observations of line features and converting the observations into a representation that is not overparameterized and permits an efficient use within additional application frameworks. The noted functions and methods will become more apparent with a further discussion of the figures.

Figure 2:
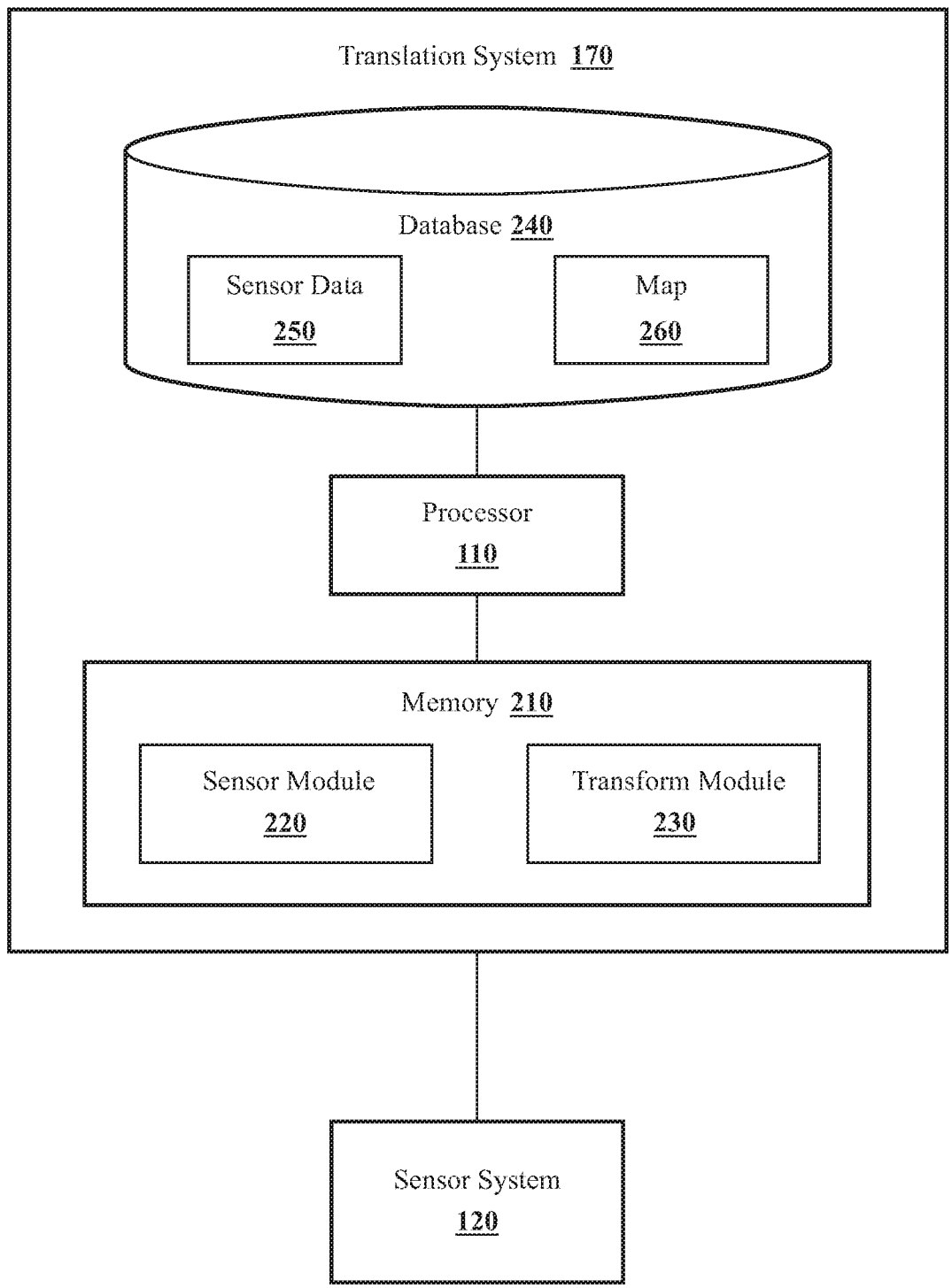
FIG. 2 illustrates one embodiment of a translation system that is associated with improving the representation of line features.

With reference to FIG. 2, one embodiment of the translation system 170 of FIG. 1 is further illustrated. The translation system 170 is shown as including a processor 110 from the vehicle 100 of FIG. 1. Accordingly, the processor 110 may be a part of the translation system 170, the translation system 170 may include a separate processor from the processor 110 of the vehicle 100 or the translation system 170 may access the processor 110 through a data bus or another communication path. In one embodiment, the translation system 170 includes a memory 210 that stores a sensor module 220 and a transform module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the sensor module 220 generally includes instructions that function to control the processor 110 to receive data inputs from one or more sensors of the vehicle 100 in the form of the sensor data 250. The sensor data 250 is, in one embodiment, perceived information that embodies observations of a surrounding environment of the vehicle 100 and, thus, observations of different objects including dynamic and static objects/surfaces within the surrounding environment. In general, as provided for herein, the sensor module 220 receives the sensor data 250 from a camera 126, LIDAR 124, radar 122, and/or other sensors that are integrated with the vehicle 100 or that provide information to the vehicle 100 from a remote location (e.g., infrastructure sensors via V2I). Of course, in further aspects, the particular configuration of sensors that produce the sensor data 250 may vary.

Furthermore, in one embodiment, the translation system 170 includes database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes sensor data 250, and a map 260 along with, for example, other information that is used by the modules 220 and 230.

For example, the sensor data 250 is electronic data that can include 3D point cloud data along with, for example, metadata describing additional characteristics such as a location of the vehicle 100 when the sensor data 250 was acquired. The sensor data 250, in one embodiment, includes further forms of electronic data as may be provided by different sensors such as images, video, radar data, and so on. Moreover, the sensor data 250 also includes, in one embodiment, information regarding poses, sizes, relative shapes of objects, textures of surfaces, features (e.g., lines, planes, cylinders, etc.), and so on. As a further matter, while the sensor data 250 is generally discussed in a singular form herein, it should be appreciated that the sensor module 220 acquires the sensor data 250 iteratively in, for example, a nearly continuous manner as the vehicle 100 travels through the surrounding environment along a road.

Moreover, in one embodiment, the database 240 also includes the map 260. In one embodiment, the map 260 is an electronic data structure that forms a representation of a road and/or a network of roads including surrounding aspects such as lane markers, signs, signposts, curbs, buildings, and so on. As further indicated, the map 260 can also include information about crosswalks, sidewalks, and other features of the surrounding environment. Accordingly, in one or more embodiments, the map 260 is a feature-based map or a similar map that stores information regarding lines and other features in the environment.

With further reference to the sensor module 220, in one embodiment, the sensor module 220 controls one or more sensors of the vehicle 100 to continuously, or at least semi-continuously, acquire the sensor data 250. Accordingly, the sensor module 220, in one embodiment, analyzes the sensor data 250 upon receipt to identify line features present therein. In general, the sensor module 220 applies line detection techniques to the sensor data 250 as may be known in the art. Thus, by way of example, the sensor module 220 receives point cloud data from the LiDAR 124 and applies a line segment detection technique to the point cloud that extracts line features therefrom. In either case, the sensor module 220 extracts the line features from the sensor data 250 and, in one embodiment, represents the line features according to feature parameters.

The feature parameters can include a six-value representation (e.g., endpoints in 3D space), a seven-value representation (e.g., one endpoint, unit direction vector, length), or some other form of representing the line feature. Whichever representation is implemented as the feature parameters, a commonality therebetween is that the feature parameters overparameterize the observed line feature. Accordingly, a corresponding covariance matrix is generally not full-rank when based on a representation that is overparameterized. As used herein, overparameterizing a line refers to the use of parameters to define the line that exceeds the number of degrees of freedom for the line (# of parameters>degrees of freedom). It should be understood that a line has four degrees of freedom, and thus any parameterization that exceeds four parameters is considered to be an overparameterization.

As such, in one embodiment, the sensor module 220 upon identifying and extracting an observed line feature form the sensor data 250, formats the observed line feature according to the feature parameters. In other words, the observed line feature is represented according to an overparameterization. In one embodiment, a covariance matrix (e.g., a six-by-six matrix) representing the probability distribution of the observed line feature is based, at least in part, on the feature parameters. Accordingly, as acquired, the sensor module 220, in one embodiment, is initially represented in an overparameterized manner.

The transform module 230 generally includes instructions that function to control the processor 110 to convert a representation of the observed line feature into a feature representation using reduced parameters that avoids overparameterizing the observed line feature. In one embodiment, the transform module 230 initially samples from the probability distribution to generate intermediate representations of the observed line feature using the reduced parameters. That is, the intermediate representations are provided in a form that conforms with the reduced parameters (i.e., four total parameters with two representing azimuth and elevation and two representing position).

The reduced parameters define the observed line feature by first specifying an orientation of the line using two parameters. In one embodiment, the orientation parameters are directional cosines (e.g., azimuths, elevation). Second, in one embodiment, the reduced parameters describe a position of the observed line feature by taking the plane which is perpendicular to the line and which passes through the origin. Thus, defining a 2-D local coordinate frame on the plane (e.g., Cartesian (x, y)), position parameters for the observed line feature are defined according to coordinate values in the local coordinate frame that give the intersection of the observed line feature with that plane.

By way of example, let the B-plane be the plane that contains the origin, and that has a normal b. Accordingly, a line B can be represented with a 4-tuple (i.e., reduced parameters) of B=($b_x$, $b_y$, x', y'), where $b_x$ and $b_y$ are components of the unit vector b and the following holds true.

$$b_x^2 + b_y^2 \le 1 \quad (1)$$

$$b_z = \pm\sqrt{1 - b_x^2 - b_y^2} \quad (2)$$

In general, x' and y' are coordinates of the intersection of line B with the B-plane, in a 2-D Cartesian frame defined on the B-plane. Moreover, in one embodiment, the provided approach includes choosing a rotation which sends $\hat{z}$ into b in order to avoid singularities. A detailed discussion of this issue is not provided herein. However, it should be appreciated that various approaches may be undertaken to achieve the noted aspect. For example, in one embodiment, the rotation is taken in the plane of $\hat{z}$ and b by an angle of arccos $\hat{z}\cdot b$. In either case, the transform module 230 produces samples according to the reduced parameters, as noted.

Thereafter, the transform module 230 applies an estimation of a nonlinear transform to the samples. In one embodiment, the transform module 230 applies an unscented transform to the samples. For example, the transform module 230 computes an error and a mean over the samples to convert the feature representation of the observed line feature into the reduced parameters and including the observation uncertainty for the observed line feature as a four-by-four covariance matrix.

By way of example, the transform module 230 determines the error by processing two intermediate representations of the observed line feature as represented in the reduced parameters. Accordingly, for samples A and B which are represented as lines $l_A$ and $l_B$ the transform module computes an error (e.g., a difference between the two separate representations). Moreover, because translating the samples into the reduced parameters produces different representations depending on an ordering of points when performing the translation, the error is computed over separate representations of the sampled lines including inverse or swapped representations as represented by equation (3).

$$\{A, B\} = \{\{l_A, l_B\}, \{l_A, \bar{l}_B\}, \{\bar{l}_A, l_B\}, \{\bar{l}_A, \bar{l}_B\}\} \quad (3)$$

$$\text{Error} = \min\left\|\begin{matrix} A_x - B_x \\ A_y - B_y \end{matrix}\right\|, \text{ minimized angle } (A_{azim} - B_{azim}), \quad (4)$$

$$\text{minimized angle } (A_{elev} - B_{elev})$$

Additionally, the transform module 230 further determines an average between $l_A$ and $l_B$. As such, the transform module 230 produces the observation uncertainty for the observed line feature according to the reduced parameters. Thus, the transform module 230, in one embodiment, converts the original observation provided using the overparameterization into the reduced parameters as shown using the unscented transform to produce a covariance matrix that is four-by-four and full-rank. Moreover, in addition to providing the covariance matrix that embodies the observation uncertainty, the reduced parameters may be provided as a single discrete representation of the noted four reduced parameters representing the observed line feature. In this way, the transform module 230 outputs a the full-rank covariance matrix for use in, for example, one or more different estimation frameworks (e.g., Kalman filtering, least squares, factor-graphs, Markov Random fields, etc.) to provide for concise determinations of line position, line correlations with map features, and so on in a probabilistic form.

Thus, in further applications of the provided reduced parameters of the observed line feature, the transform module 230, in one embodiment, identifies a potentially corresponding line feature from within the map 260. In various implementations, the transform module 230 identifies mapped line feature according to one or more known approaches. In either case, the transform module 230 can then use the observed uncertainty distribution of the covariance matrix to perform sensor fusion between the corresponding/mapped line feature and the observed line feature. According to this fusion, the transform module 230 provides a detection distribution that estimates position/attitude of the vehicle 100, calibration parameters, a 3D map of the surrounding environment, or another estimation framework that is modeled according to the detection distribution produced from the reduced parameters.

Figure 3:
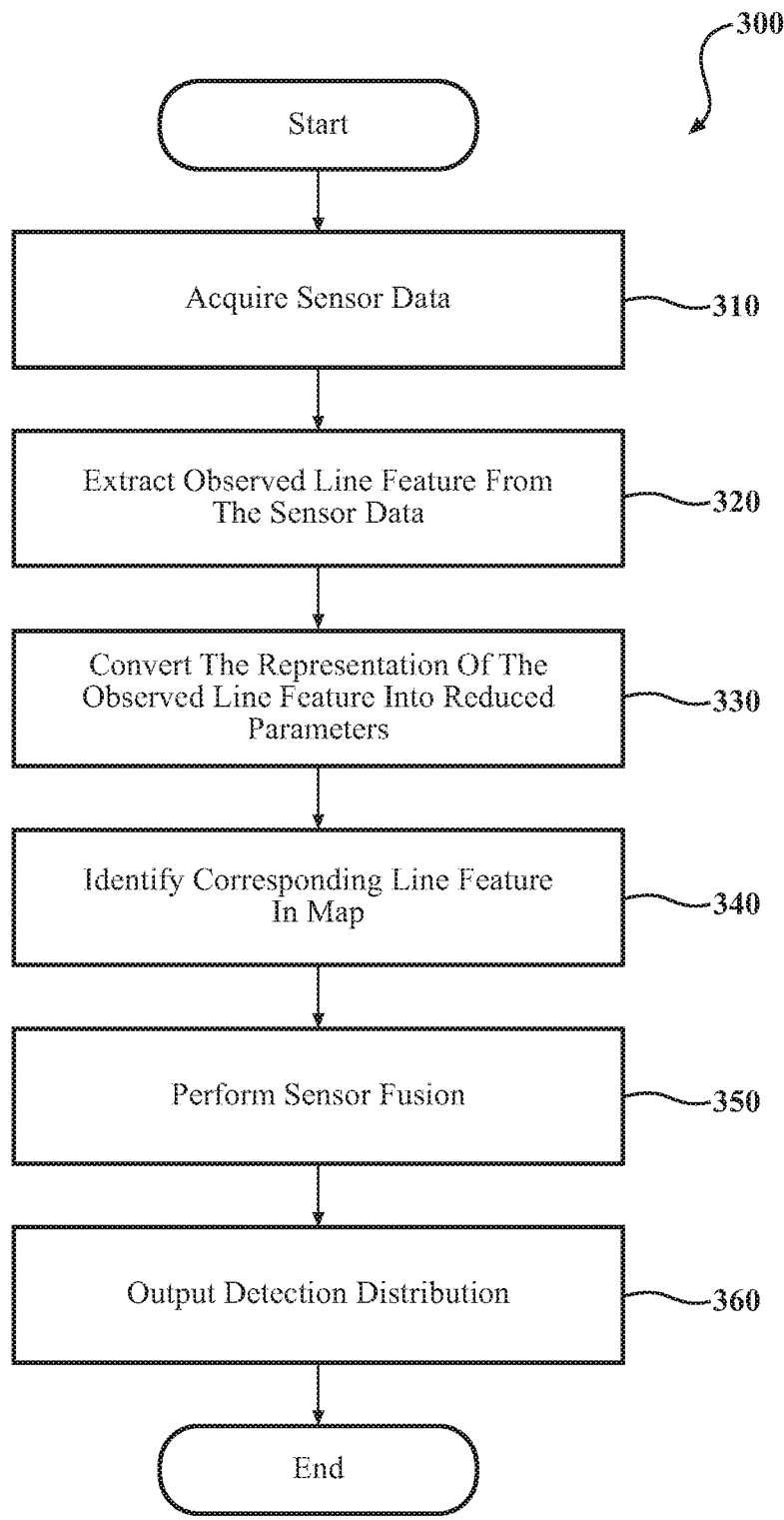
FIG. 3 illustrates one embodiment of a method associated using a reduced representation for line features that avoids overparameterization.

Additional aspects of representing line features within electronic systems using reduced parameters that avoid overparameterizing the line features will be discussed in relation to FIG. 3. FIG. 3 illustrates a flowchart of a method 300 that is associated with translating observed line features between different representations to avoid overparameterization. Method 300 will be discussed from the perspective of the translation system 170 of FIGS. 1, and 2. While method 300 is discussed in combination with the translation system 170, it should be appreciated that the method 300 is not limited to being implemented within translation system 170 but is instead one example of a system that may implement the method 300.

At 310, the sensor module 220 acquires from at least one sensor of the vehicle 100 the sensor data 250. In one embodiment, the sensor module 220 controls the LIDAR sensor 124 to produce the sensor data 250 as a 3D point cloud representing the surrounding environment. Alternatively, or additionally, the sensor module 220 controls a camera 126 to acquire images of the surrounding environment as at least a portion of the sensor data 250. In various embodiments, the sensors are configured to include different fields of view around the vehicle 100. For example, the sensors may have a 360-degree field of view about the vehicle 100, a forward-facing field of view, or another configuration. In further aspects, the sensors may be selectively employed to focus on particular regions (e.g., oncoming road surface).

Moreover, in further embodiments, the sensor module 220 controls the one or more sensors of the sensor system 120 to at least semi-continuously scan the surrounding environment and provide the sensor data 250. The sensor data 250 is generally considered to be a noisy observation of the surrounding environment. That is, as an artifact of collecting the sensor data 250 or from intrinsic aspects of the environment itself, noise that influences perceptions of the sensors 120 is embedded within the sensor data 250. Thus, the sensor module 220, in one embodiment, represents the sensor data according to probability distributions, which represent the uncertainty of the observations in relation to a precise location of a given line feature.

At 320, the sensor module 220 extracts a feature representation of an observed line feature in the sensor data 250. In one embodiment, the sensor module 220 includes a line segment detector that employs one or more line segment detection techniques as may be known in the art to identify line features within the sensor data 250 and to then extract the line features therefrom.

Additionally, in one embodiment, the sensor module 220 represents the extracted line features by providing a probability distribution. In one embodiment, the sensor module 220 defines the probability distribution based, at least in part, on feature parameters that overparameterize the observed line feature. As previously described, the feature parameters can represent the line feature using endpoints in 3D space, according to an endpoint, unit direction vector, and length, or according to another parameterization. In either case, the observed line feature is initially overparameterized and the observation is noisy, which results in potential difficulties with accurately representing the observed line feature in various estimation frameworks (e.g., Kalman filtering).

At 330, the transform module 230 converts the feature representation of the observed line feature into reduced parameters. As previously discussed at length, the reduced parameters provide a one-to-one correspondence with the degrees of freedom for a line and include two position values and two orientation values (azimuth, elevation). The reduced parameters avoid the difficulties of overparameterization by providing for the transform module 230 to produce, as an additional aspect of the reduced parameters, an observation uncertainty for the observed line feature that is based, at least part, on the probability distribution.

The transform module 230 provides the reduced parameters including the observation uncertainty for the observed line feature by applying an unscented transform to the representation of the observed line features as acquired at 310-320. The unscented transform is generally an approach to converting the observed line feature that estimates a non-linear transform between the feature parameters and the reduced parameters. Accordingly, in one approach, the transform module 230 executes two separate determinations over at least two separate samples of the observed line feature.

For example, the transform module 230 selectively samples from the probability distribution representing the observed line feature. Thus, the transform module 230 may generate two separate intermediate representations of the observed line feature that are provided according to the feature parameters (e.g., 6 value representation). Thus, the two intermediate representations are selective samples of the line feature that produce two intermediate lines. The transform module 230 then converts the representations into vectors of the reduced parameters before proceeding with the functions of the unscented transform. Thus, the vectors include four values of the reduced parameters as previously explained.

The transform module 230 then, in one embodiment, uses the intermediate lines represented in the reduced parameters to compute an error therebetween and also to compute a mean. Moreover, as previously outlined, the transform module 230 swaps values to compute the error for inverse representations of the lines because of differences in how the reduced parameters represent the intermediate lines depending on a direction of the conversion (e.g., point A and point B into line A vs point B and point into line A'). In either case, the transform module 230 computes the error by determining differences between angular and positional values between the intermediate lines as represented using the reduced parameters. Thus, for two intermediate lines, in one embodiment, there will be four separate representations used to compute the error because of the inverse representations.

Furthermore, the transform module 230 also computes an average/mean for the observed line feature over the intermediate lines. As such, the transform module 230 generates an electronic output in the form of a mean vector representing the observed lined feature according to the reduced parameters and a full-rank covariance matrix that is four-by-four representing the observation uncertainty. Thus, the full-rank covariance matrix quantifies innovation of the observed line feature according to the reduced parameters and provides for an improved integration with subsequent estimation frameworks.

At 340, the transform module 230 identifies a mapped line feature from the map 260 that potentially corresponds with the observed line feature. In one embodiment, the mapped line feature is represented according to the reduced parameters. In further aspects, the transform module 230 dynamically translates the mapped line feature from an overparameterized representation into a representation that uses the reduced parameters. In either case, the mapped line feature is selected and provided according to a potential correlation with the observed line feature and using the reduced parameters. Moreover, the mapped line feature is generally provided within the context of a particular estimation framework for purposes of mapping, localizing or performing another suitable functionality.

At 350, the transform module 230 performs sensor fusion between the observed line feature and the mapped line feature. In one embodiment, the transform module 230 applies an estimation framework to perform the sensor fusion that uses Kalman filtering, particle filtering, factor-graphs, Markov random fields, or another suitable framework to estimate the correlation. Whichever particular process is employed, the observation uncertainty from 330 embodied in the full-rank covariance matrix provides for implementing the estimation framework using a fully probabilistic approach without coarsely estimating the correlation using weighting or another approach.

At 360, the transform module 230 provides an electronic output of a detection distribution that results from the sensor fusion as discussed at block 350. In general, the detection distribution indicates an estimation uncertainty for a correlation between the mapped line feature and the observed line feature that is a function of the observation uncertainty. In either case, the detection distribution is a modeled distribution that provides information about the surrounding environment according to the observed line feature and is provided according to the reduced parameters. Consequently, the translation system 170, in one embodiment, controls one or more aspects of the vehicle 100 according to the detection distribution. For example, in one embodiment, the detection distribution is used within a simultaneous localization and mapping (SLAM) framework to model observed line features and determine a location of the vehicle 100 therefrom. In further aspects, the detection distribution maps line features within the environment. In either case, the localization and/or mapping provided for by the detection distribution influence operation of the autonomous driving module 160, and by extension the vehicle 100 by factoring into determinations of path selection, vehicle controls, and so on.

Figure 4:
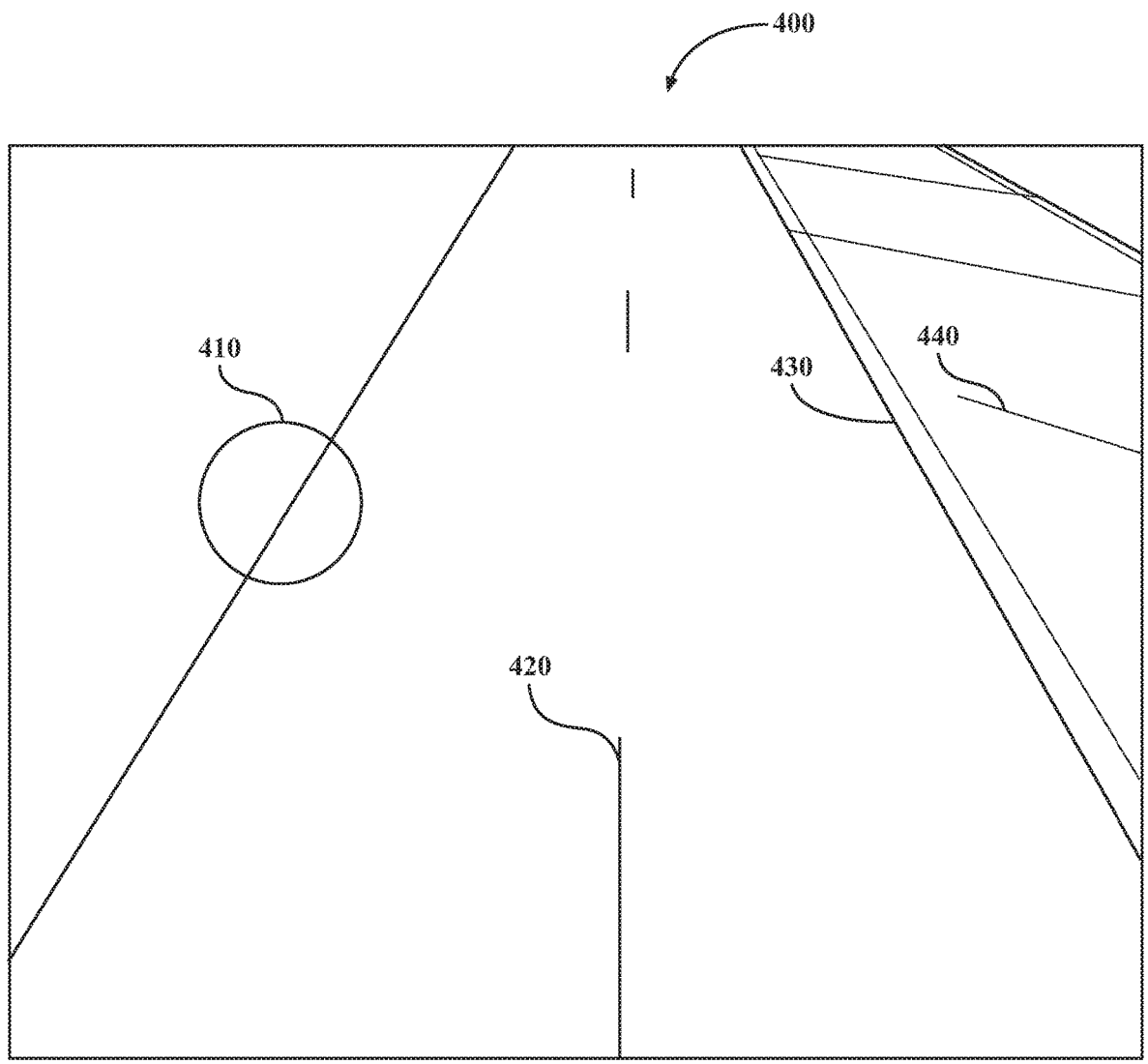
FIG. 4 illustrates an example of multiple line features as observed using electronic sensors.
Figure 5:
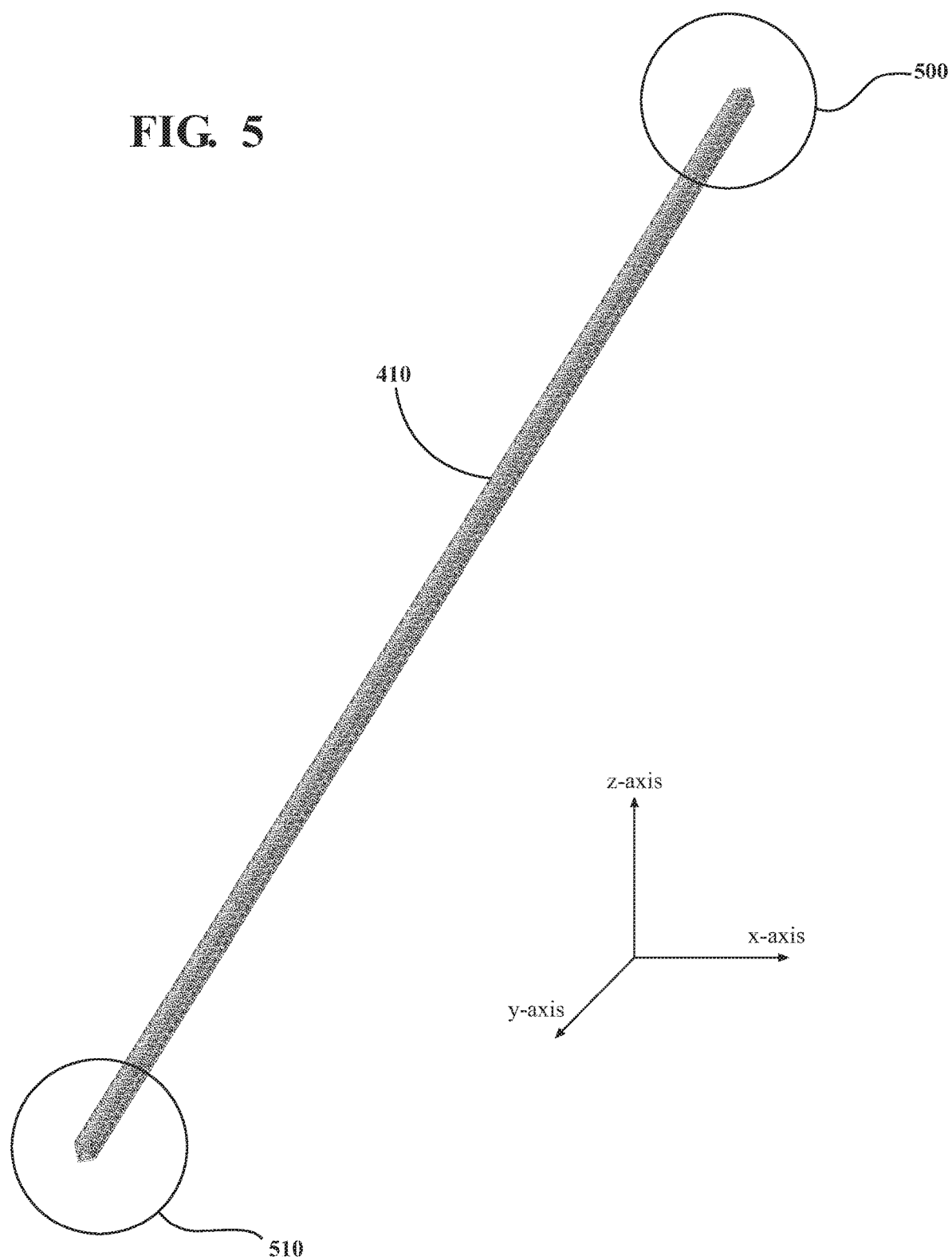
FIG. 5 is an illustration of an isolated view of a line feature.

As a further explanation of how the translation system 170 improves the representation of line features, consider FIG. 4. FIG. 4 illustrates an example observation 400 of line features as may be acquired by the sensor module 220 and extracted from the sensor data 250. As illustrated, the observation 400 includes multiple different line features which generally correlate with different markings on a roadway. The noted line features include 410, 420, 430, and 440. Line feature 410 is a lane boundary marker, line feature 420 is a lane marker, line feature 430 is a lane boundary maker, and line feature 440 is a hash marking indicating a restricted area of the road. As previously discussed, the line features are initially extracted and represented using feature parameters that overparameterize the line features. Moreover, the line features are represented according to a probability distribution since exact locations of the lines are not known due to noisy observations.

Accordingly, as previously set forth, the transform module 230 initially samples from the probability distribution according to a prescribed pattern (e.g., sigma points) to represent the line features and then convert the line features into the reduced parameters. By way of example, consider FIG. 5, which illustrates an isolated view of the line feature 410 from FIG. 4. As shown, the line feature 410 is comprised of a distribution of points as acquired in the sensor data 250. Accordingly, in one embodiment, the transform module 230 samples from the points to provide intermediate representations of the line feature 410. For example, in one approach, the transform module 230 samples from the endpoints 500 and 510 to generate the intermediate representations using six endpoint values. Of course, in further approaches, the sampling and representations may take other forms. In either case, the transform module 230 converts the intermediate line features into the reduced parameters according to, in one embodiment, an approach discussed by Roberts in "A New Representation for a Line," from Machine Perception Research Department, AT&T Bell Laboratories, which is wholly incorporated herein by reference.

Accordingly, as a result of the conversion, the intermediate lines are represented using the reduced parameters. However, the uncertainty distribution for the line feature also is to be converted. Thus, the transform module 230 applies an unscented transform to the intermediate sampled lines to generate a mean vector that represents the line feature 410 using the noted reduced parameters and also a covariance matrix that represents the observation uncertainty of the line feature 410. By producing the representation of the line feature 410 using the reduced parameters the corresponding covariance matrix is full-rank and thus improves subsequent use within estimation frameworks.

With reference to FIG. 4, assuming that the illustrated line segments 410, 420, 430, and 440 are represented according to the reduced parameters as previously explained, in one estimation framework approach, corresponding mapped line features can be selected from the map 260 and correlated according to, for example, Kalman filtering in order to localize the vehicle 100 within the illustrated environment. In this way, the translation system 170 provides an improved representation for line features that improves integration within subsequent estimation frameworks to extrapolate a probabilistic approach without compensating for overparameterized representations using inefficient processes.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the translation system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the translation system 170, and/or the autonomous driving module(s) 160 may control some or all of these vehicle systems 140 and, thus, may be partially or fully autonomous.

The processor(s) 110, the translation system 170, and/or the autonomous driving module(s) 160 can be operatively connected to communicate with the various vehicle systems 140 and/or individual components thereof. For example, returning to FIG. 1, the processor(s) 110, the translation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the translation system 170, and/or the autonomous driving module(s) 160 may control some or all of these vehicle systems 140.

The processor(s) 110, the translation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the translation system 170, and/or the autonomous driving module(s) 160 can control the direction and/or speed of the vehicle 100. The processor(s) 110, the translation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the translation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the transform module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code for carrying out operations for aspects of the present arrangements may be written in any combination of one or more programming languages, including an object-oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A translation system for improving electronic representation of lines, comprising:
   one or more processors;
   a memory communicably coupled to the one or more processors and storing:
   a sensor module including instructions that when executed by the one or more processors cause the one or more processors to, in response to acquiring sensor data from at least one sensor representing a surrounding environment of a robotic device, extract a feature representation of an observed line feature in the sensor data by providing a probability distribution that is defined based, at least in part, on feature parameters that overparameterize the observed line feature; and
   a transform module including instructions that when executed by the one or more processors cause the one or more processors to convert the feature representation of the observed line feature into reduced parameters to avoid the feature parameters overparameterizing the observed line feature, wherein the reduced parameters include an observation uncertainty for the observed line feature that is based, at least part, on the probability distribution, and
   wherein the transform module includes instructions to provide a detection distribution according to a correlation between the reduced parameters and a mapped line feature.

2. The translation system of claim 1, wherein the transform module includes instructions to convert the feature representation including instructions to apply an unscented transform to estimate a non-linear transform between the feature parameters and the reduced parameters and provide the feature representation according to the reduced parameters including a vector with four values representing the observed line feature and a covariance matrix that is four-by-four in size and full-rank representing the observation uncertainty.

3. The translation system of claim 2, wherein the transform module includes instructions to apply the unscented transform including instructions to:
   i) compute an error between samples of the probability distribution by comparing inverse representation and standard representations of the observed line feature from the probability distribution, wherein computing the error includes determining differences between angular and positional values, wherein the samples are represented using the reduced parameters, and
   ii) compute an average for the observed line feature over the samples, and
   wherein applying the unscented transform produces the vector and the covariance matrix that is full-rank as an electronic output.

4. The translation system of claim 2, wherein the transform module includes instructions to provide the covariance matrix as an electronic output that quantifies innovation between the observed line feature and the mapped line feature; and
   wherein the transform module includes instructions to provide the detection distribution including instructions to estimate a location of the robotic device based, at least in part, on the covariance matrix.

5. The translation system of claim 1, wherein the sensor module includes instructions to identify the mapped line feature from a feature map, the mapped line feature being represented according to the reduced parameters, wherein the transform module includes instructions to provide the detection distribution to indicate at least an estimation uncertainty for a correlation between the mapped line feature and the observed line feature that is a function of the observation uncertainty.

6. The translation system of claim 1, wherein the sensor module includes instructions to acquire the sensor data including noise along with the observed line feature that at least partially distorts the observed line feature within the sensor data, and
   wherein the reduced parameters include position and orientation parameters defining an azimuth and an elevation for the observed line feature.

7. The translation system of claim 1, wherein the sensor data includes at least one of: a three-dimensional representation of the surrounding environment as a point cloud, and a camera image, and
   wherein the feature parameters include at least six values defining endpoints of the observed line feature in Euclidean three-space.

8. The translation system of claim 1, wherein the probability distribution is quantified in a six-by-six covariance matrix, and
   wherein the reduced parameters include at least a full-rank covariance matrix that quantifies innovation of the observed line feature.

9. A non-transitory computer-readable medium for improving an electronic representation of lines and including instructions that when executed by one or more processors cause the one or more processors to:
   in response to acquiring sensor data from at least one sensor representing a surrounding environment of a robotic device, extract a feature representation of an observed line feature in the sensor data by providing a probability distribution that is defined based, at least in part, on feature parameters that overparameterize the observed line feature;
   convert the feature representation of the observed line feature into reduced parameters to avoid the feature parameters overparameterizing the observed line feature, wherein the reduced parameters include an observation uncertainty for the observed line feature that is based, at least part, on the probability distribution; and
   provide a detection distribution according to a correlation between the reduced parameters and a mapped line feature.

10. The non-transitory computer-readable medium of claim 9, wherein the instructions to convert the feature representation include instructions to apply an unscented transform to estimate a non-linear transform between the feature parameters and the reduced parameters and provide the feature representation according to the reduced parameters including a vector with four values representing the observed line feature and a full-rank covariance matrix that is four-by-four in size representing the observation uncertainty.

11. The non-transitory computer-readable medium of claim 10, wherein the instructions to apply the unscented transform include instructions to:
   i) compute an error between samples of the probability distribution by comparing inverse representation and standard representations of the observed line feature from the probability distribution, wherein computing the error includes determining differences between angular and positional values, wherein the samples are represented using the reduced parameters, and ii) compute an average for the observed line feature over the samples, and
   wherein applying the unscented transform produces the vector and the full-rank covariance matrix as an electronic output.

12. The non-transitory computer-readable medium of claim 10, wherein the instructions to convert the observed line feature include instructions to provide the full-rank covariance matrix as an electronic output that quantifies innovation between the observed line feature and the mapped line feature; and
   wherein the instructions to provide the detection distribution include instructions to estimate a location of the robotic device based, at least in part, on the full-rank covariance matrix.

13. The non-transitory computer-readable medium of claim 9, wherein the instructions include instructions to acquire the sensor data including noise along with the observed line feature that at least partially distorts the observed line feature within the sensor data, and
   wherein the reduced parameters include position and orientation parameters defining an azimuth and an elevation for the observed line feature.

14. A method of improving an electronic representation of lines, comprising:
   in response to acquiring sensor data from at least one sensor representing a surrounding environment of a robotic device, extracting a feature representation of an observed line feature in the sensor data by providing a probability distribution that is defined based, at least in part, on feature parameters that overparameterize the observed line feature;
   converting the feature representation of the observed line feature into reduced parameters to avoid the feature parameters overparameterizing the observed line feature, wherein the reduced parameters include an observation uncertainty for the observed line feature that is based, at least part, on the probability distribution; and
   providing a detection distribution according to a correlation between the reduced parameters and a mapped line feature.

15. The method of claim 14, wherein converting the feature representation includes applying an unscented transform to estimate a non-linear transform between the feature parameters and the reduced parameters, and providing the feature representation according to the reduced parameters including a vector with four values representing the observed line feature and a full-rank covariance matrix that is four-by-four in size representing the observation uncertainty, and wherein the probability distribution indicates a marginal uncertainty of the observed line feature.

16. The method of claim 15, wherein applying the unscented transform includes:
   i) computing an error between samples of the probability distribution by comparing inverse representation and standard representations of the observed line feature from the probability distribution, wherein computing the error includes determining differences between angular and positional values, wherein the samples are represented using the reduced parameters, and
   ii) computing an average for the observed line feature over the samples, wherein applying the unscented transform produces the vector and the full-rank covariance matrix as an electronic output.

17. The method of claim 15, wherein providing the feature representation using the reduced parameters includes providing the full-rank covariance matrix as an electronic output that quantifies innovation of the observation uncertainty; and
   wherein providing the detection distribution includes estimating a location of the robotic device based, at least in part, on the full-rank covariance matrix.

18. The method of claim 14, further comprising:
   identifying the mapped line feature from a feature map, the mapped line feature being represented according to the reduced parameters, wherein providing the detection distribution indicates at least an estimation uncertainty for a correlation between the mapped line feature and the observed line feature that is a function of the observation uncertainty.

19. The method of claim 14, wherein acquiring the sensor data includes acquiring noise along with the observed line feature that at least partially distorts the observed line feature within the sensor data, and wherein the reduced parameters include position and orientation parameters defining an azimuth and an elevation for the observed line feature.

20. The method of claim 14, wherein the sensor data includes at least one of: a three-dimensional representation of the surrounding environment as a point cloud, and a camera image,
   wherein the feature parameters include at least six values defining endpoints of the observed line feature in three-dimensional space, wherein the probability distribution is quantified in a covariance matrix that is six-by-six in size, and
   wherein the reduced parameters include at least a full-rank covariance matrix that quantifies innovation of the observed line feature.

* * * * *